(12) United States Patent
Picossi Goñi (10) Patent No.: US 11,081,093 B1
(45) Date of Patent: Aug. 3, 2021

(54) MUSIC NOTATION SYSTEM

(71) Applicant: Juan Manuel Picossi Goñi, Seville (ES)

(72) Inventor: Juan Manuel Picossi Goñi, Seville (ES)

(73) Assignee: Juan Manuel Picossi Goñi, Seville (ES)

( * ) Notice: Subject to any disclaimer, the term of this patent is extended or adjusted under 35 U.S.C. 154(b) by 0 days.

(21) Appl. No.: 16/869,776

(22) Filed: May 8, 2020

(51) Int. Cl.
  *G10G 1/04* (2006.01)
  *G09B 15/02* (2006.01)

(52) U.S. Cl.
  CPC ............. *G10G 1/04* (2013.01); *G09B 15/023* (2013.01)

(58) Field of Classification Search
  CPC .............................. G10G 1/04; G09B 15/023
  USPC ........................................................ 84/483.1
  See application file for complete search history.

(56) References Cited

U.S. PATENT DOCUMENTS

| | | | | |
|---|---|---|---|---|
| 347,686 A * | 8/1886 | Carpenter et al. | ....... | G10G 1/00 84/483.1 |
| 429,841 A * | 6/1890 | Clements-Kropp | ..... | G10G 1/00 84/483.1 |
| 438,429 A * | 10/1890 | Clemens | ................ | G09B 15/02 84/483.2 |
| 608,771 A * | 8/1898 | Guilford | .............. | G09B 15/026 84/471 R |
| 663,512 A * | 12/1900 | Peterson | ................ | G09B 15/02 84/483.2 |
| 1,473,495 A * | 11/1923 | Miller | ...................... | G10G 1/00 84/483.2 |
| 1,526,547 A * | 2/1925 | Hughey | ............... | G09B 15/026 84/471 R |
| 1,646,574 A * | 10/1927 | Buzza | ..................... | G10G 1/04 84/483.1 |
| 2,221,143 A * | 11/1940 | Lang | ......................... | G10G 1/00 84/478 |
| 2,619,867 A * | 12/1952 | Frisch | ..................... | G10G 1/04 84/475 |
| 6,388,182 B1 * | 5/2002 | Bermudez | ............ | G09B 15/026 84/470 R |
| 6,987,220 B2 * | 1/2006 | Holcombe | ........... | G09B 15/026 84/483.2 |
| 7,241,945 B1 * | 7/2007 | Egan | ..................... | G09B 15/00 84/471 R |
| 7,674,965 B2 * | 3/2010 | Mataele | ............... | G09B 15/023 84/483.2 |
| 7,767,895 B2 * | 8/2010 | Johnston | ............... | G09B 15/02 84/483.2 |
| 7,982,115 B2 | 7/2011 | Johnston | | |
| 8,039,722 B2 * | 10/2011 | MacCoy | ................ | G09B 15/02 84/483.2 |
| 8,835,737 B2 * | 9/2014 | King | .................... | G09B 15/023 84/483.2 |
| 8,916,760 B1 | 12/2014 | West et al. | | |
| 9,183,755 B2 * | 11/2015 | Shi | ....................... | G09B 15/023 |
| 9,196,171 B2 * | 11/2015 | Nguyen | ............... | G09B 15/026 |
| 9,406,241 B2 * | 8/2016 | Cosgrove | ............ | G09B 15/023 |

(Continued)

*Primary Examiner* — Robert W Horn
(74) *Attorney, Agent, or Firm* — Tristan A. Fuierer; Olive Law Group, PLLC (57) ABSTRACT

An improved music notation system. The music notation system broadly uses numbers for notes, colors for octaves or scales, and bars and symbols for note duration. The system is easy to team and use and can be adapted for use by any instrument, e.g., a keyboard instrument.

20 Claims, 8 Drawing Sheets

(56) References Cited

U.S. PATENT DOCUMENTS

| | | | |
|---|---|---|---|
| 9,947,238 B2 * | 4/2018 | Tolan | G09B 15/02 |
| 9,947,301 B2 * | 4/2018 | Kelsey | G10G 1/04 |
| 10,002,542 B1 * | 6/2018 | Jenkins | G10G 1/02 |
| 10,096,305 B2 | 10/2018 | Brenna | |
| 10,354,625 B2 * | 7/2019 | Wei | G10H 1/0016 |
| 10,515,614 B2 * | 12/2019 | Zhou | G10H 1/34 |
| 2008/0295670 A9 * | 12/2008 | Egan | G09B 15/06 84/483.2 |
| 2008/0302233 A1 * | 12/2008 | Ding | G09B 15/023 84/609 |
| 2012/0036980 A1 | 2/2012 | Antaki | |

* cited by examiner

|   | | | | |
|---|---|---|---|---|
|   | $1_2$ | $8_2$ | $1_{0.5}$ | $5_{0.5}$ |
|   |   |   | $5_{0.5}$ |   |
|   |   |   | $6_{0.5}$ |   |
|   |   |   | $8_{0.5}$ |   |
|   |   | $8_1$ | $8_{0.5}$ |   |
|   |   |   | $6_{0.5}$ |   |
|   |   | $8_1$ | $5_{0.5}$ |   |
|   |   |   | $3_{0.5}$ |   |
| $1_2$ | $5_2$ | $8_2$ | $1_{0.5}$ |   |
|   |   |   | $1_{0.5}$ |   |
|   |   |   | $3_{0.5}$ |   |
|   |   |   | $5_{0.5}$ |   |
|   |   | $8_{1.5}$ | $5_1$ |   |
|   |   |   | $3_{0.5}$ |   |
|   |   | $8_1$ | $12_1$ | $3_1$ |
|   | $1_1$ | $8_2$ | $1_{0.5}$ | $5_{0.5}$ |
|   |   |   | $5_{0.5}$ |   |
|   |   |   | $6_{0.5}$ |   |
|   |   |   | $8_{0.5}$ |   |
|   |   | $8_1$ | $8_{0.5}$ |   |
|   |   |   | $6_{0.5}$ |   |
|   |   | $8_1$ | $5_{0.5}$ |   |
|   |   |   | $3_{0.5}$ |   |
| $1_2$ | $5_2$ | $8_2$ | $1_{0.5}$ |   |
|   |   |   | $1_{0.5}$ |   |
|   |   |   | $3_{0.5}$ |   |
|   |   |   | $5_{0.5}$ |   |

MUSIC NOTATION SYSTEM

FIELD

The present invention generally relates to a system of notating and a method of reading music. The system and method can be applied to any instrument.

DESCRIPTION OF THE RELATED ART

The standard system of music notation uses an upper (or treble) staff and a lower (or bass) staff) each staff having five parallel horizontal lines, with each line and intervening space representing a specific note on the A-G scale, corresponding to the white keys on a piano. To indicate that a particular note is to be played, an oval note symbol is centered on the line, or marked in the space, corresponding to the desired note. When a desired note does not come within either of the standard staffs, supplemental spaced lines must be added above or below the appropriate staff, allowing tire desired note to be marked on or adjacent to one of the added lines. A person reading the music thus notated can determine the identity of a note above or below a staff with reference to the number of added lines. If the additional lines are so many, making it difficult to read, reference it made to the next octave wherein 8 ava is used to indicate the same note in the next octave and 15 ava is used to indicate the same note in next 2 octaves.

When a desired note corresponds to one of tire black keys on a piano, a note symbol is marked on a line or in a space corresponding to a note adjacent to the desired note, and a "sharp" or "flat" symbol is added to the note symbol, indicating that the note to be played is actually one half-tone higher or lower, respectively, than the note symbol would otherwise suggest. Key signatures are indicated by showing sharp or flat symbols at the left end of each staff, corresponding to the sharp or flat notes in the scale of the musical key in question (e.g., C major, E-flat minor, etc.). This makes it unnecessary to use a sharp or flat every time the music calls for a note corresponding to a black key. At the stone time, however, it can complicate matters for the music student, who must learn to interpret the symbols with reference to the relevant key signature.

In the standard notation system, vertical lines are drawn across the staffs to indicate the beginning or end of each bar (or "measure") in a musical composition, A bar represents a specific number of beats (or tune intervals) corresponding to the time signature (i.e., tempo) of the music. For example, a "3/4" time signature indicates that 3 quarter-notes (or notes totaling the equivalent thereof) are to be played per bar (i.e., waltz tempo), whereas a "6/8" time signature indicates that 6 eighth-notes are to be played per bar. The time signature is typically indicated at the left end of each staff.

The standard notation system uses various ways to indicate the length of a note, or the duration of time for which it is to be held. For example, if the oval note symbol is solidly shaded and has a vertical stem line, it indicates a quarter-note. A similar notation but with the oval note symbol being unshaded, denotes a half-note. An unshaded note symbol with no stem line denotes a whole note, corresponding to the length of a bar. Notes of shorter duration than a quarter-note have symbols as well.

The standard notation system uses a system of letters (e.g., p, mf, sfz, etc.) and symbols (e.g., for crescendos and accents) to indicate sound intensity, or volume. In addition, clefs (e.g., the treble clef, alto and tenor clefs, bass clefs) are used to inform the pitch range of the staff on which it is placed. The same symbol represents different pitches depending on the clef used.

In addition to standard notation, many alternative systems have been developed to visually represent music. Among these, "piano roll" notation and Klavarskribo (or Klavar) address some of the usability issues of standard notation. For example, piano roll notation, often seen in music production software, typically provides color coding, variable-length symbols to indicate note duration, and a chromatic keyboard-style layout. However, piano roll notation is best suited to music editing, rather than learning and performance. The user is presented with visual representation of notes, but no guidance on which hand or finger plays the notes, or design elements to provide context within the layout. Also, the connection hues in standard notation that indicate musical phrases or groups of notes are absent in piano roll notation.

Overall, the standard and known alternative music notation systems make it difficult for many people to learn, to read and play music. In view of such known difficulties associated with the standard notation system, there is a need for a new music notation system that is easier to read and learn.

SUMMARY

The present invention generally relates to a system of notating and a method of reading music. The system and method desert bed herein for keyboard instruments, such as a piano, but can be adapted for any instrument.

In one aspect, a musical notation system for an instrument is described, said musical notation system comprising:
  a number from 1 through 12 for each of the twelve notes in an octave;
  a color that is unique to each octave of the instrument; and
  at least one symbol denoting a duration of each note to be played on the instrument,
  wherein each, of the number, color, and at least one symbol are provided on a geometric shape having four sides.

In another aspect, a method for visually representing music to be played on an instrument is described, said method, comprising:
  assigning a geometric shape to each note to be played, wherein each geometric shape comprises a number from 1 through 12 for each of the twelve notes in an octave, a color that is unique to each octave of the instrument, and at least one symbol denoting a duration of each note to be played on the instrument; and
  arranging each assigned geometric shape (i) vertically or horizontally and (ii) chronologically as said note is intended to be played, on a visualization medium.

Other aspects, features and embodiments of the invention will be more fully apparent from the ensuing disclosure and appended claims.

DETAILED DESCRIPTION, AND PREFERRED EMBODIMENTS THEREOF

The present invention is a music notation system that broadly uses numbers for notes, colors for octaves or scales, and bars and symbols for note duration. The system is easy to learn and use and can be adapted for use by any instrument, e.g., a keyboard instrument.

In particular, there is a need for a new music notation system that is less abstract that the standard system, one that uses note representations that are visually referable to the notes on an instrument, e.g., a keyboard instrument. The new music notation system preferably uses separate note indications for each specific musical tone, without requiring special markings or symbols to indicate the musical octave in which a desired note is located. In addition, the new music notation system eliminates the need for flats and sharps (i.e., accidental symbols), such that each note indication denotes precisely the same note in all contexts, regardless of the key signature. Further, the music notation system described herein provides a direct visual representation of note lengths, thus eliminating the need to interpret note indications according to the standard system, which are non-intuitive conventions, in order to determine bow long the indicated notes are to be held. The present invention is directed to each one of these needs.

As described herein, an "instrument" includes any object or device that produces musical sounds. An instrument includes anything classified as a percussion instruments, a wind instrument, a stringed instrument, or an electronic instrument. The enumerated list is very extensive As described herein, a "keyboard instrument" includes anything classified as a chordophone, an aerophone, an idiophone, and an electrophone, regardless of the number of octaves, including, but not limited to, a piano having 88 keys and seven octaves (e.g., as shown in FIG. 1), a harpsichord, a clavinet, a fortepiano, an accordion, a pump organ, a pipe organ, a melodica, an electric piano, an electronic keyboard, an electronic organ, an electronic piano, and a synthesizer.

The present inventor discloses herein a new music notation system and method of using for an instrument, for example a keyboard instrument, wherein the musical score can be easily interpreted on a printed music sheet or visualization medium, as described further herein.

Figure 1:
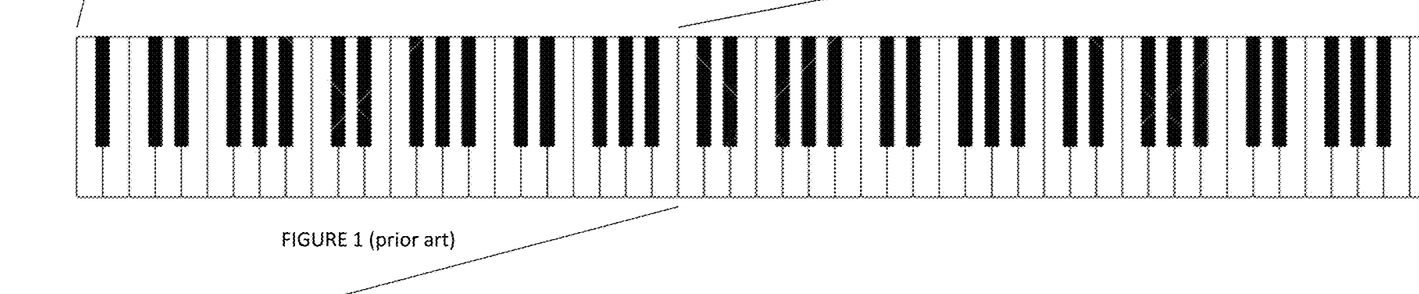
FIG. 1 illustrates a keyboard of an 88-key piano, as known in the prior art.

Reference will be made to a keyboard instrument, specifically a piano having 88 keys and seven octaves (e.g., as shown in FIG. 1), but it should be appreciated by the person skilled in the art that the system described herein can be adapted for use with any other instrument.

Regarding musical notes, the twelve musical notes of an octave are represented by numbers 1 through 12, as presented in Table 1:

TABLE 1

Twelve musical notes

| American | European (Italian) | Present Invention |
|---|---|---|
| C | Do | 1 |
| C Sharp/D flat | Do diesis/Re bemolle | 2 |
| D | Re | 3 |
| D Sharp/E flat | Re diesis/Mi bemolle | 4 |
| E | Mi | 5 |
| F | Fa | 6 |
| F Sharp/G flat | Fa diesis/Sol bemolle | 7 |
| G | Sol | 8 |
| G Sharp/A flat | Sol diesis/La bemolle | 9 |
| A | La | 10 |
| A Sharp/B flat | La diesis/Si bemolle | 11 |
| B | Si | 12 |

Figure 2A:
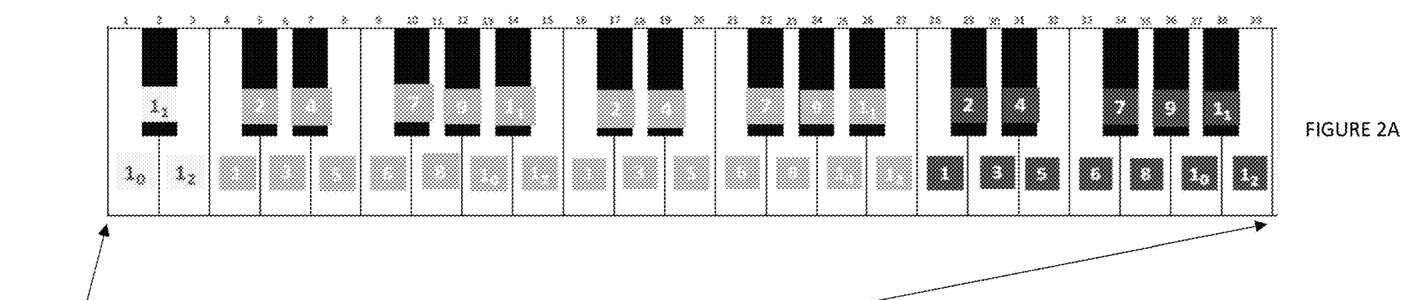
FIG. 2A illustrates keys 1-39 of the 88-key piano of FIG. 1.
Figure 2B:
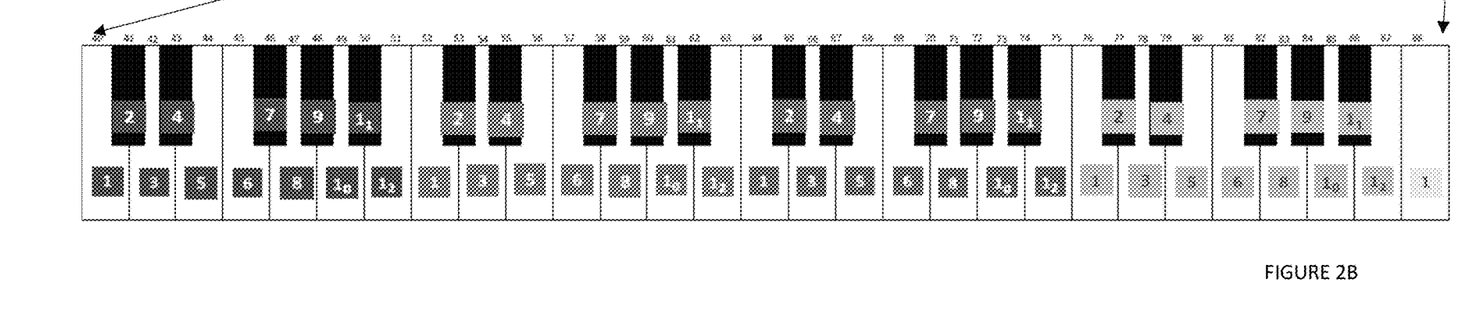
FIG. 2B illustrates keys 40-88 of the 88-key piano of FIG. 1.

Referring to FIG. 1, it can be seen that reference is made to FIG. 2A (keys 1-39) and FIG. 2B (keys 40-88). In FIGS. 2A and 2B, the seven octaves of an 88 key keyboard are each shown numbered 1-12. Further, each octave, or scale, is represented by a different color. For example, keys 4-15 (first octave, shown as golden with white numbering in figures as filed), keys 16-27 (second octave, shown as pink with white numbering in figures as filed), keys 28-39 (third octave, shown as red with white numbering in figures as filed), keys 40-51 (fourth octave, shown as dark blue with white numbering in figures as filed), keys 52-63 (fifth octave, shown as light blue with white numbering in figures as filed), keys 64-75 (sixth octave, shown as kelly green with white numbering in figures as filed), and keys 76-87 (seventh octave, shown as moss green with blue numbering in figures as filed) each represent an octave. Keys 1-3 (cream colored with red numbering) and 88 (light green with blue numbering) are represented separately. Advantageously, using the numbers and the colors eliminates the need for pitch notations, e.g., clefs, in the music notation system described herein. It should be appreciated that instead of numbers, the American system (e.g., C, D, E, F, G, A, B, with sharps and flats) can be used combined with the colors. With regards to the colors, it should be appreciated that the colors shown in FIGS. 2A-2B are merely illustrative and that alternative colors can be used. The colors and numbers can be applied to the keyboard as temporary or permanent adhesive labels, or alternatively, the keyboard instrument can be manufactured with the colors and numbers embedded on the keys themselves.

Figure 3A:
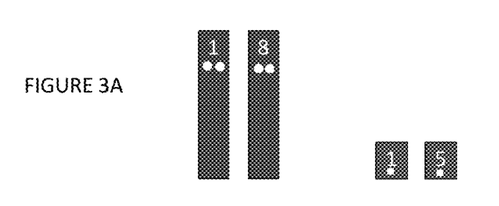
FIG. 3A illustrates the sheet notation of the system described herein comprising vertical bars.
Figure 3B:
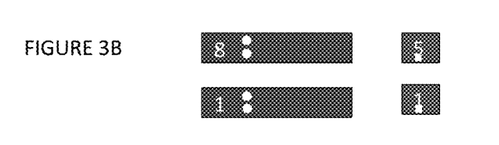
FIG. 3B illustrates the sheet notation of the system described herein comprising horizontal bars.

Only the notes that are to be played appear on the music sheet. For example, referring to FIGS. 3A and 3B, the sheet notation can comprise vertical bars (FIG. 3A) or horizontal bars (FIG. 3B). In FIGS. 3A and 3B, key 1 (C) and key 8 (G)

of the third octave are played with the left hand while key 1 (C) and key 5 (E) of the fourth octave are played with the right hand.

Advantageously, the music notation system described herein includes a simplified way of indicating duration of each note. The exact duration of a note can be known in seconds or fractions of a second. In a first embodiment, the length of a vertical or horizontal four-sided geometric shape (hereinafter a "bar") indicates the duration of the note. The bar has a length and a width, and it is understood that the bar can be substantially square or that the length will be greater than or less than the width. Based on the music score, the note with the shortest duration will be assigned the shortest bar length. Each other note will be assigned a bar length relative to the shortest bar based on the duration relative to the shortest note. Longer notes therefore will have a proportionally longer bar. For example, the half-second bar will be half the length of the one second bar. Every single note having the same duration in the music score will have the same bar length. It should be appreciated that the bar length for same duration, e.g., one second, may be different in one musical score relative to a different musical score. It should be appreciated that, a music score can establish different lengths for a duration, e.g., one second, in case the shortest note is not common in the music score.

Figure 4:
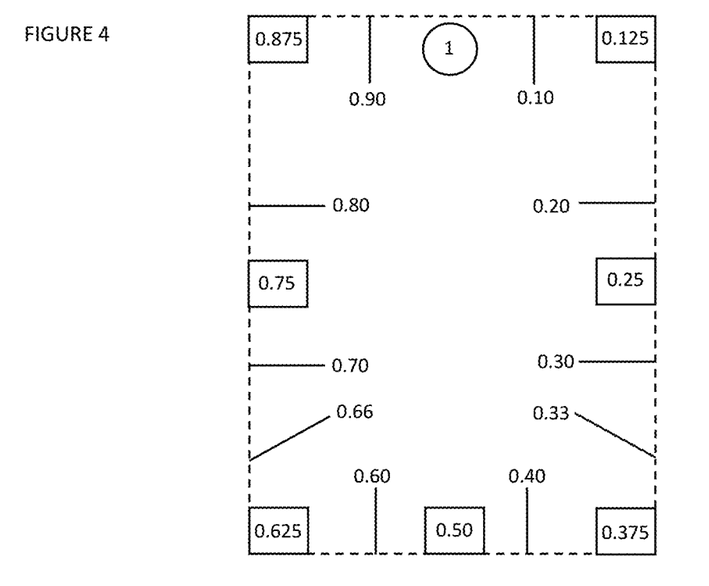
FIG. 4 illustrates an example of a duration notation system using symbols.
Figure 5A:
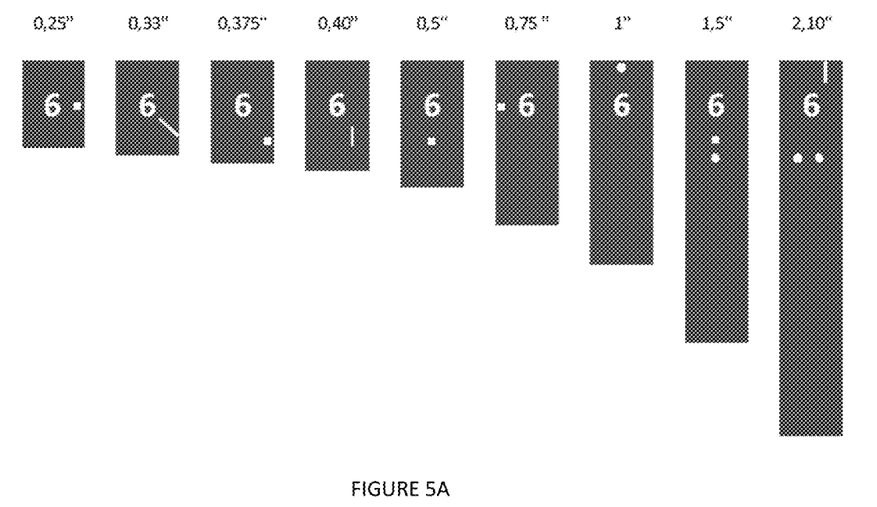
FIG. 5A illustrates an example of duration using bar length and the symbols of FIG. 4 positioned on the bars for the fourth octave.
Figure 5B:
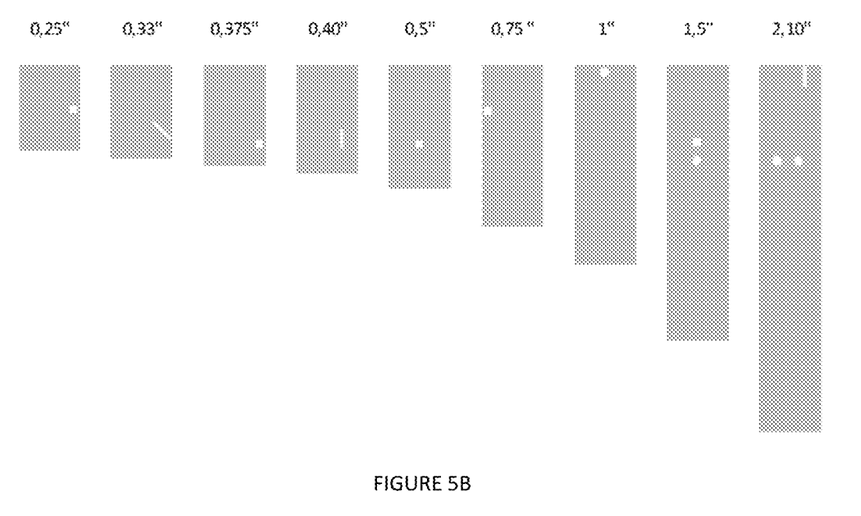
FIG. 5B illustrates an example of duration using bar length and the symbols of FIG. 4 positioned on the bars for silences.

In a second embodiment, the duration is indicated by a symbol on the bar. The shape of the at least one symbol is selected from the group consisting of a square, a circle, a vertical line, a horizontal line, an oblique line, and any combination thereof. Referring to FIG. 4, the symbols for durations of 0.10, 0.125, 0.20, 0.25, 0.30, 0.33, 0.375, 0.40, 0.50, 0.60, 0.625, 0.66, 0.70, 0.75, 0.80, 0.875, 0.90, and 1 second are shown positioned within a "frame," denoted by the dashed rectangle. These symbols can be shown on the vertical or horizontal bars, for example, as shown in FIGS. 5A and 5B. Referring to FIG. 5A, representing in this case the fourth octave, the bar lengths are directly proportional to the duration, wherein 0.25 seconds is the shortest duration. That said, the difference between 0.25 seconds and 0.33 seconds, for example, is difficult to see using bar lengths only. As such, each bar is further supplemented with a symbol. The 0.25 second bar has a square to the right of the number 6, consistent with the symbol introduced in FIG. 4. The 0.33 second bar has an oblique line transmitting from the center of the bar, and so on. Once the duration exceeds 1 second, the circles for each second are provided below the FIG. 4 symbol "frame" (i.e., below the symbols for fractional seconds) and the durations are denoted by multiple symbols For example, the 1.5 second duration includes a 0.50 second square positioned in the FIG. 4 "frame" and a single 1 second circle positioned below the frame. The 2.1 second duration is represented by the 0.10 line near the top right of the FIG. 4 "frame" with two circles below the FIG. 4 "frame." The combination of the bar length and the symbols provides a reliable and easy way to identify duration of each note. It should be appreciated by the person skilled in the art that the symbols introduced in FIG. 4, e.g., squares, circles, lines (vertical, horizontal, or oblique), are not intended to limit the invention in any way and alternative symbols can be chosen.

FIG. 5B introduces the bar lengths (in grey) and use of symbols for silences, when needed.

In a third embodiment, the duration is provided as a timeline on the music score or sheet itself. This timeline can be placed in the center separating the notes that are played with the left and right hands, whether provided vertically (i.e., FIGS. 6A and 6B) or horizontally (i.e., FIGS. 6C and 6D). For the vertical notation, every second can be represented with a horizontal line. For the horizontal notation, every second can be represented with a vertical line. Every 5 seconds a small number is displayed, e.g., 5, 10, 15, 20, 25, 30, 35, 40, 45, 50 and 55 seconds (see, e.g., FIGS. 6A-6D). After the first minute completes, a "1" can be displayed. For simplicity, durations past 1 minute can be denoted again as seconds only, e.g., 5, 10, 15, 20, 25, 30, 35, 40, 45, 50 and 55 seconds, wherein the person reading the music score understands that the duration is between 1 and 2 minutes. After the second minute, a "2" will be displayed, and so on.

It should be appreciated that the duration can be represented by at least one of the three duration embodiments described herein: bar length, symbols for duration, and timeline. In other words, the music score or sheet can represent duration as just bar length, just symbols for duration, just timeline, a combination of bar length and symbols for duration, a combination of bar length and timeline, a combination of symbols for duration and timeline, or a combination of bar length, symbols for duration, and timeline.

With regards to volume, it is contemplated that the standard notation symbols for volume can be used. Alternatively, it is contemplated that a symbol system for volume can be devised and included in the bar to express volume.

Figure 6A:
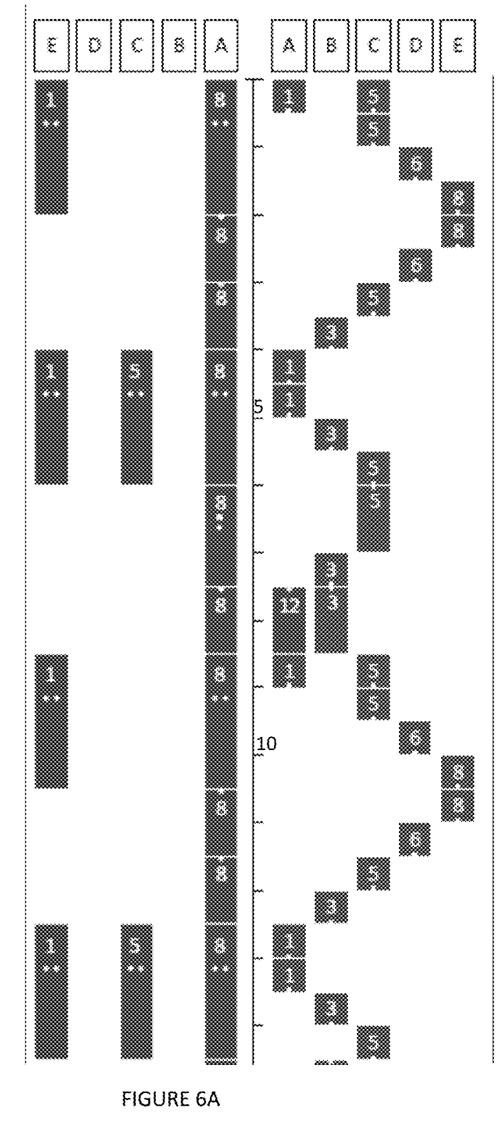
FIG. 6A illustrates an example of a vertical music score for The Hymn of Joy illustrating notes, octaves, durations, and which finger plays which note.
Figure 6B:
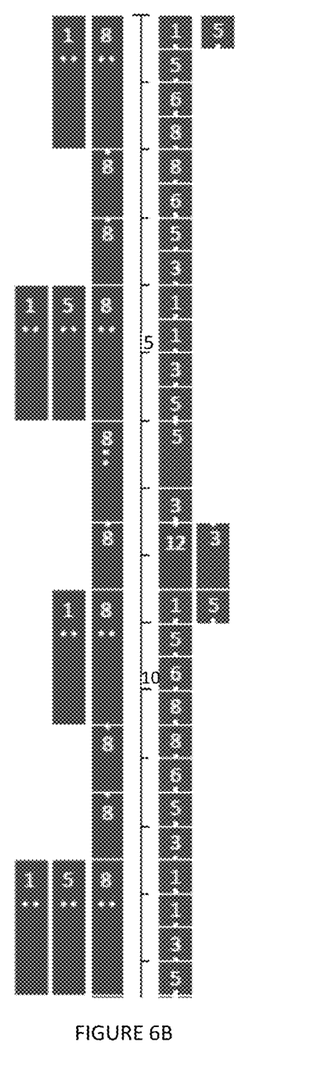
FIG. 6B illustrates an example of a vertical music score for The Hymn of Joy illustrating notes, octaves, and durations.
Figure 6C:
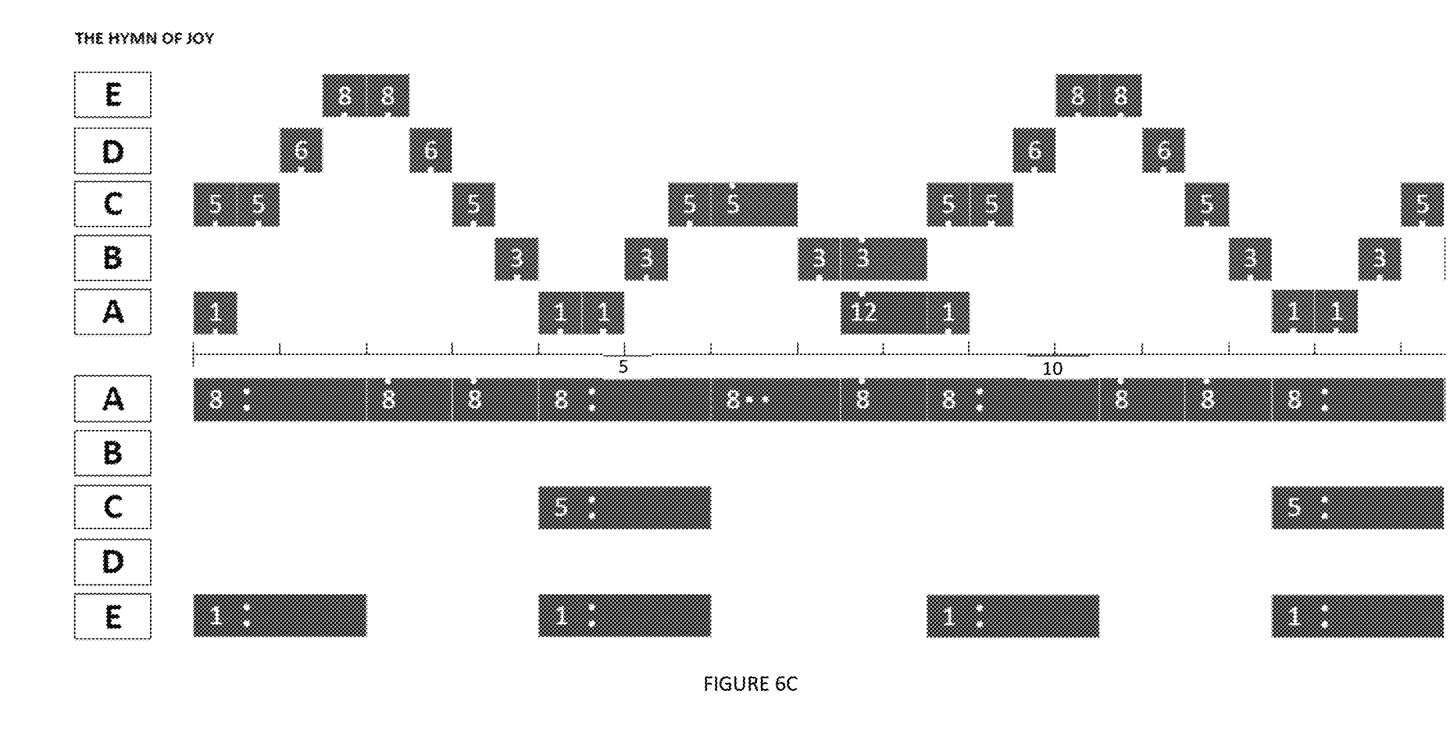
FIG. 6C illustrates an example of a horizontal music score for The Hymn of Joy illustrating notes, octaves, durations, and which finger plays which note.
Figure 6D:
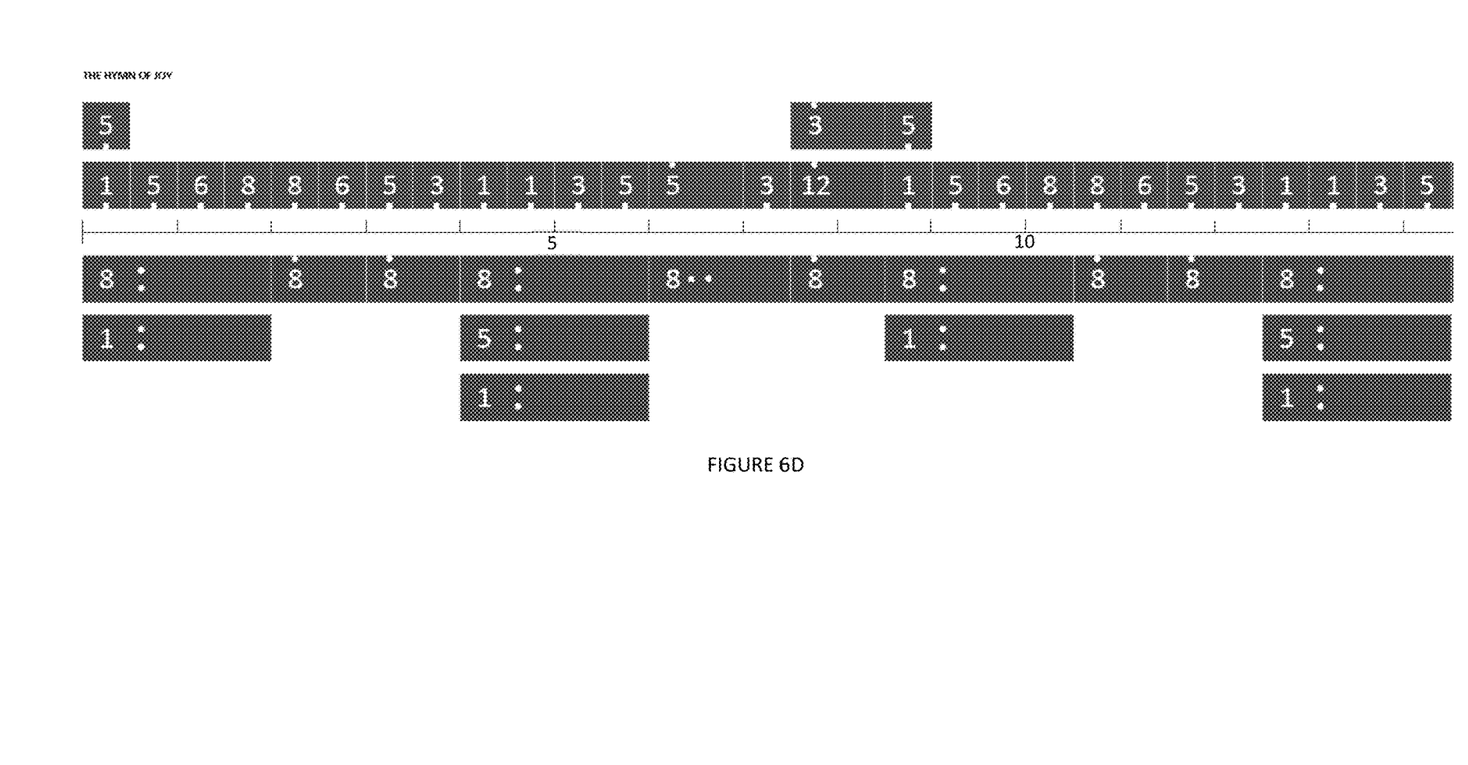
FIG. 6D illustrates an example of a horizontal music score for The Hymn of Joy illustrating notes, octaves, and durations.

How the notes are played can be illustrated in one of two ways. As introduced hereinabove, the music score or sheet can be read vertically (e.g., FIGS. 6A and 6B) or horizontally (e.g., FIGS. 6C and 6D). FIGS. 6A and 6C illustrate which finger is used to touch which note, wherein "a" is a thumb, "b" is an index finger, "c" is a middle finger, "d" is a ring finger, and "e" is a little finger. It should be appreciated that different indications of the fingers can be used, for example based on different finger sizes (e.g., children versus adults) and the skill. These indications can be given via software. FIGS. 6B and 6D illustrate the same musical score as FIGS. 6A and 6C, respectively, but without showing finger placement. As can be seen in FIGS. 6A-6D, the octave (or scale) is provided for each hand by referring to the color of the bars. Further, the duration in FIGS. 6A-6D is provided by the bar length, the symbols for duration, and the timeline. It should be appreciated that the user will play each note indicated in chronological order, analogous to the standard notation system. Further, it should be appreciated that the vertical or horizontal notations can be displayed on a "visualization medium" including, but not limited to, a piece of paper, a book or other multipage medium, a computer screen, a tablet, a cell phone, a television screen, a projector screen, or any other medium that permits the user to visualize the bars comprising the number, color, and duration of the notes to be played as intended.

Although not shown, the music notation system described herein simplifies when other instruments should play if the composition includes multiple instruments. For example, it is easy to envision an indication on any of FIGS. 6A-6D as to when another instrument will be playing.

There are multiple advantages associated with the system described herein including, but not limited to:
  Ease of writing and reading. The music notation system described herein is simplified and easy to learn. There are no key signatures, clefs, or staffs. Anyone with or without musical knowledge can interpret what note to play.
  Can be used with existing keyboard instruments. Temporary or permanent adhesive labels can be applied to the keys of any keyboard instrument for immediate implementation of the system described herein.

An easier way to indicate duration. The exact duration of a note can be known in seconds and fractions of a second. The timeline permits the user to know the total duration of the music score or sheet. No metronome is needed—only a digital or analog clock.

Ease of interpretation. It is possible to indicate which finger will touch each note using the system described herein. The understanding of the music scores or sheets utilizing the system described herein will be universal and similar to typing on a computer keyboard.

Ease of composition. Each halftone means one more number, so it will be much easier to write music, and know how many semitones to vary for the next note.

Memorization of music scores or sheets. Because the music scores or sheets prepared using the system described herein are very visual, those that learn and memorize visually will more easily memorize the music score.

Figure 7A:
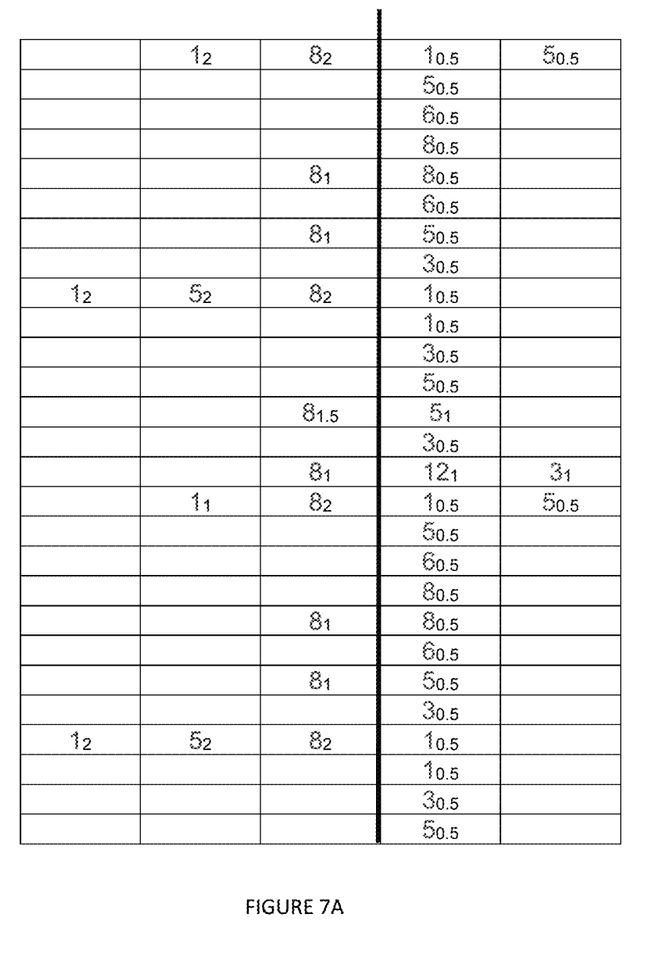
FIG. 7A illustrates a manually written vertical music score for The Hymn of Joy illustrating notes, octaves, and durations.
Figure 7B:
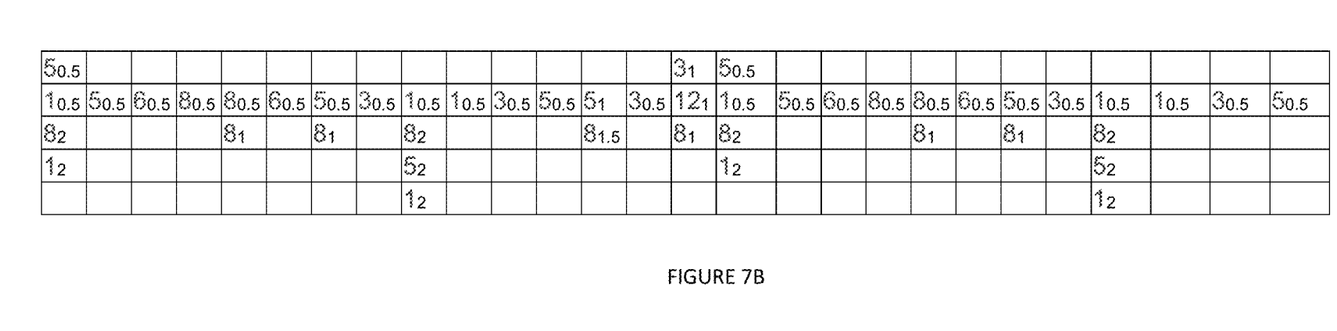
FIG. 7B illustrates a manually written horizontal music score for The Hymn of Joy illustrating notes, octaves, and durations.

Manual writing. Referring to FIGS. 7A and 7B, it can be seen that it is easy to write or type the music score consistent with the system described herein, wherein any of the 12 notes to be played are indicated, along with the octave (or scale) (based on the color of the number) and the duration (subscript). For example, the first line of FIG. 7A are identical to the first notes played in FIGS. 6A and 6B in octave and duration.

Software. Software can be used to generate the music score or sheet. For example, played notes can be converted to a music sheet comprising the bars described herein, complete with an indication of note, duration, and octave. Alternatively, software can be used to convert manually written music scores to the bars described herein. In still another alternative, computer programs can be used to interpret music written in other notations, for example, standard notation or piano roll notation, and convert to the music notation system described herein.

The system and method described herein can be easily adapted for use with any instrument.

Although the invention has been variously disclosed herein with reference to illustrative embodiments and features, it will be appreciated that the embodiments and features described hereinabove are not intended to limit the invention, and that other variations, modifications and other embodiments will suggest themselves to those of ordinary skill in the art, based on the disclosure herein. The invention therefore is to be broadly construed, as encompassing all such variations, modifications and alternative embodiments within the spirit and scope of the claims hereafter set forth.

What is claimed is:

1. A musical notation system for an instrument comprising:
    a number from 1 through 12 for each of the twelve notes in an octave;
    a color that is unique to each octave of the instrument; and
    at least one symbol denoting a duration of each note to be played on the instrument,
    wherein the at least one symbol is used to denote 1 second, at least one fraction of 1 second, and a combination thereof, wherein each distinctive duration between greater than zero and 1 second has a unique symbol, and wherein each of the number, color, and at least one symbol are provided on a geometric shape having four sides.

2. The system of claim 1, wherein the number 1 corresponds to the C note, the number 2 corresponds to the C Sharp/D flat note, the number 3 corresponds to the D note, the number 4 corresponds to the D Sharp/E flat note, the number 5 corresponds to the E note, the number 6 corresponds to the F note, the number 7 corresponds to the F Sharp/G flat note, the number 8 corresponds to the G note, the number 9 corresponds to the G Sharp/A flat note, the number 10 corresponds to the A note, the number 11 corresponds to the A Sharp/B flat note, and the number 12 corresponds to the B note.

3. The system of claim 1, wherein each octave on the instrument is uniquely numbered 1 through 12.

4. The system of claim 1, wherein the at least one fraction of 1 second comprises at least one of 0.10, 0.125, 0.20, 0.25, 0.30, 0.33, 0.375, 0.40, 0.50, 0.60, 0.625, 0.66, 0.70, 0.75, 0.80, 0.875, 0.90, and any combination thereof.

5. The system of claim 1, wherein the at least one symbol is selected from the group consisting of a square, a circle, a vertical line, a horizontal line, an oblique line, and any combination thereof.

6. The system of claim 1, wherein more than one symbol is used to denote a total duration of greater than one minute, wherein the cumulative amount of each symbol equals the total duration.

7. The system of claim 1, wherein the geometric shape having four sides is a that has a length and a width, wherein the length of the bar is proportional to duration of each note to be played on the instrument.

8. The system of claim 7, wherein every note having the same duration will have the same bar length.

9. The system of claim 1, further comprising a timeline to denote total cumulative time.

10. The system of claim 1, wherein each bar is arranged (i) vertically or horizontally and (ii) chronologically as said note is intended to be played, wherein a music score is displayed on a visualization medium.

11. The system of claim 1, wherein the visualization medium is selected from the group consisting of a piece of paper, a book or other multipage medium, a computer screen, a tablet, a cell phone, a television screen, and a projector screen.

12. The system of claim 1, wherein there are no key signatures, clefs, or staffs.

13. The system of claim 10, wherein the music score further comprises an indication of which finger places which note.

14. The system of claim 1, wherein the instrument is a keyboard instrument.

15. The system of claim 13, wherein the keyboard instrument is selected from the group consisting of a piano having 88 keys and seven octaves, a harpsichord, a clavinet, a fortepiano, an accordion, a pump organ, a pipe organ, a melodica, an electric piano, an electronic keyboard, an electronic organ, an electronic piano, and a synthesizer.

16. A method for visually representing music to be played on an instrument, said method comprising:
    assigning a geometric shape to each note to be played, wherein each geometric shape comprises a number from 1 through 12 for each of the twelve notes in an octave, a color that is unique to each octave of the instrument, and at least one symbol denoting a duration of each note to be played on the instrument; and
    arranging each assigned geometric shape (i) vertically or horizontally and (ii) chronologically as said note is intended to be played, on a visualization medium,
    wherein the at least one symbol is used to denote 1 second, at least one fraction of 1 second, and a combination thereof, wherein each distinctive duration between greater than zero and 1 second has a unique symbol.

17. The method of claim 16, wherein the number 1 corresponds to the C note, the number 2 corresponds to the C Sharp/D flat note, the number 3 corresponds to the D note, the number 4 corresponds to the D Sharp/E flat note, the number 5 corresponds to the E note, the number 6 corresponds to the F note, the number 7 corresponds to the F Sharp/G flat note, the number 8 corresponds to the G note, the number 9 corresponds to the G Sharp/A flat note, the number 10 corresponds to the A note, the number 11 corresponds to the A Sharp/B flat note, and the number 12 corresponds to the B note.

18. The method of claim 16, wherein the at least one fraction of 1 second comprises at least one of 0.10, 0.125, 0.20, 0.25, 0.30, 0.33, 0.375, 0.40, 0.50, 0.60, 0.625, 0.66, 0.70, 0.75, 0.80, 0.875, 0.90, and any combination thereof.

19. The method of claim 16, wherein more than one symbol is used to denote a total duration of greater than one minute, wherein the cumulative amount of each symbol equals the total duration.

20. The method of claim 16, wherein the geometric shape having four sides is a that has a length and a width, wherein the length of the bar is proportional to duration of each note to be played on the instrument.

* * * * *